(12) United States Patent
Mitov et al.

(10) Patent No.: US 7,887,892 B2
(45) Date of Patent: Feb. 15, 2011

(54) METHOD OF PRODUCING A LIQUID CRYSTAL MATERIAL THAT REFLECTS MORE THAN 50% OF NON-POLARISED INCIDENT LIGHT

(75) Inventors: Michel Mitov, Toulouse (FR); Nathalie Dessaud, Pays-Bas (NL)

(73) Assignee: Centre National de la Recherche Scientifique (CNRS), Paris (FR)

( * ) Notice: Subject to any disclaimer, the term of this patent is extended or adjusted under 35 U.S.C. 154(b) by 118 days.

(21) Appl. No.: 11/991,621

(22) PCT Filed: Aug. 31, 2006

(86) PCT No.: PCT/EP2006/065894

§ 371 (c)(1),
(2), (4) Date: Mar. 6, 2008

(87) PCT Pub. No.: WO2007/028767

PCT Pub. Date: Mar. 15, 2007

(65) Prior Publication Data
US 2009/0098313 A1    Apr. 16, 2009

(30) Foreign Application Priority Data
Sep. 8, 2005    (FR) .................................. 05 09157

(51) Int. Cl.
*C09K 19/00*    (2006.01)
*C09K 19/52*    (2006.01)
*C09K 19/06*    (2006.01)

(52) U.S. Cl. .......................... 428/1.1; 428/1.2; 428/1.3; 428/1.4; 252/299.01; 252/299.6; 430/20; 349/1; 349/56

(58) Field of Classification Search ........... 428/1.1–1.4; 252/299.01, 299.6; 430/20; 349/1, 56
See application file for complete search history.

(56) References Cited

U.S. PATENT DOCUMENTS

| | | | |
|---|---|---|---|
| 5,691,789 A | 11/1997 | Li et al. |
| 5,940,150 A | 8/1999 | Faris et al. |
| 5,999,243 A | 12/1999 | Kameyama et al. |
| 6,010,643 A | 1/2000 | Coates et al. |
| 6,017,468 A | 1/2000 | Chung et al. |
| 6,057,008 A | 5/2000 | Schwalb et al. |
| 6,061,108 A | 5/2000 | Anderson et al. |
| 6,071,438 A | 6/2000 | Leigeber et al. |
| 6,099,758 A | 8/2000 | Verrall et al. |
| 2002/0041346 A1 | 4/2002 | Faris et al. |
| 2002/0057400 A1 | 5/2002 | Li et al. |
| 2003/0104144 A1 | 6/2003 | Hammond-Smith et al. |
| 2004/0011994 A1 | 1/2004 | Yumoto et al. |
| 2009/0128744 A1* | 5/2009 | Mitov .......................... 430/20 |

FOREIGN PATENT DOCUMENTS

| | | |
|---|---|---|
| EP | 0982605 | 3/2000 |
| EP | 1249483 | 10/2002 |
| EP | 1295929 | 3/2003 |
| FR | 2781062 | 1/2000 |
| GB | 2326727 | 12/1998 |
| GB | 2355720 | 5/2001 |
| WO | WO 94-15785 | 7/1994 |
| WO | WO 97-16762 | 5/1997 |
| WO | WO 98-57223 | 12/1998 |
| WO | WO 99-63400 | 12/1999 |
| WO | WO 00-60407 | 10/2000 |
| WO | WO 02/056067 A2 | 7/2002 |

OTHER PUBLICATIONS

Michel Mitov, et al.; "Broadening of light reflection in glassy cholesteric materials and switchable Polymer-Stabilized Cholersteric Liquid Crystals,"; *Proceedings of SPIE*, vol. 4463, 2001, pp. 11-20.

(Continued)

*Primary Examiner*—Geraldina Visconti
(74) *Attorney, Agent, or Firm*—Blakely, Sokoloff, Taylor & Zafman LLP

(57) ABSTRACT

The invention relates to a method of producing a liquid crystal material. The inventive method is characterised in that it comprises the following steps consisting in: applying a first treatment to a liquid crystal mixture having a helical structure comprising a first non-photoreactive liquid crystal (A) and a second photoreactive liquid crystal (B), said first treatment modifying a handedness of the helix of the mixture; and applying a second treatment to the mixture such that the second liquid crystal (B) forms a polymer network, said second treatment being performed during all or part of the first treatment such that the liquid crystal material retains a memory of the modifications to the helix and the entire volume of the material has both a right-handed and left-handed helical structure. The invention also relates to a liquid crystal device comprising a liquid crystal material consisting of at least one liquid crystal having a helical structure, which is characterised in that the entire volume of the material has both a right-handed and left-handed helical structure, such that the device has a reflection rate of more than 50%.

39 Claims, 1 Drawing Sheet

OTHER PUBLICATIONS

Alexandrine Lavernhe, et al.; "Prelimination communication: How to broaden the light reflection band in cholesteric liquid crystals? A new approach based on polymorphism"; *Liquid Crystals*, vol. 28, 2001, pp. 803-807.

Michel Mitov, et al.; "Glassy Cholesteric Broadband Reflectors with a Pitch Gradient: Material Design, Optical Properties and Microstructure,"; *Mol. Cryst. and Liq. Cryst.*, vol. 358, 2001, pp. 209-223.

Corrine Binet, et al.; "Switchable broadband light reflection in polymer-stabilized cholesteric liquid crystals,"; *Journal of Applied Physics*, vol. 90, No. 4, Aug. 15, 2001, pp. 1730-1734.

* cited by examiner

METHOD OF PRODUCING A LIQUID CRYSTAL MATERIAL THAT REFLECTS MORE THAN 50% OF NON-POLARISED INCIDENT LIGHT

This is a non-provisional application claiming the benefit of International application number PCT/EP2006/065894 filed Aug. 31, 2006.

FIELD OF THE INVENTION

This invention relates to the field of liquid crystals, and more particularly liquid crystal materials adapted for reflecting incident light.

STATE OF THE ART

Today, liquid crystal based materials are increasingly used because of their optical properties which enable them to control visible and invisible (infrared IR and ultraviolet UV) light waves.

In particular, cholesteric liquid crystal based materials have been developed, because they have optical properties that differ from those of nematic liquid crystals due to their helical structure. This helical structure enables cholesteric liquid crystal to selectively reflect light with an associated wavelength $\lambda_R$ related to the pitch p of the helical structure by the relationship (in normal incidence):

$$\lambda_R = n \cdot p$$

where n is the mean refractive index of the cholesteric liquid crystal ($n=(n_e+n_o)/2$ where $n_e$ and $n_o$ are the extraordinary and ordinary optical indices). The reflection bandwidth $\Delta\lambda$ is related to $\lambda_R$, to n and to the birefringence $\Delta n = n_e - n_o$ by the relationship:

$$\Delta\lambda = \lambda_R \cdot \Delta n / n$$

Since $(\Delta n)_{max}$ is of the order of 0.3 for common organic compounds, $\Delta\lambda$ is usually limited to the visible range below 100 nm and is typically equal to 50 nm. Thus, only a limited fraction of the rays may be reflected by a conventional cholesteric liquid crystal.

Even though, for certain applications, reflective selectivity is required in cholesteric liquid crystals, many applications exist for which such selectivity is a disadvantage.

This is because, in order to effectively change the energy (light, heat) crossing a window composed of a liquid crystal material for example, the material must be adapted for reflect a wide range of wavelengths. This makes it possible to improve the heat balance of certain closed spaces, such as in buildings or means of transport, and so save energy (for example by removing the need for air-conditioning).

As well as the area of so-called smart windows, liquid crystal materials having broad, unusual, reflective properties, further have applications in many other sectors such as telecommunications (photonic reflecting materials), optics (antiglare eyewear), heating (IR reflecting coatings), military (IR stealth), and displays (black on white reflecting display without polariser).

Pioneering work by the Philips group has made it possible to produce solid cholesteric liquid crystal materials that reflect light over a broader band of wavelengths, of the order of 300 nm (cf. D. J. Broer, J. Lub and G. N. Mol, *Nature* 378, 467[1995]). This increase is a result of the structure of the cholesteric liquid crystal material, which has a helicity that depends on the pitch gradient.

One aim of the present invention is to provide a liquid crystal material having broader ranging reflecting properties and a process for making such a liquid crystal material.

DISCLOSURE OF THE INVENTION

To this end, the invention describes a method of producing a liquid crystal material, characterised in that it comprises the steps of:

Applying a first treatment to a liquid crystal mixture having a helical structure comprising a first non-photoreactive liquid crystal (A) and a second photoreactive liquid crystal (B), said first treatment modifying a handedness of the helix of the mixture;

Applying a second treatment to the mixture such that the second liquid crystal (B) forms a polymer network, said second treatment being performed during all or part of the first treatment such that the liquid crystal material keeps a memory of the modifications to the helix and the entire volume of the material has both a right-handed and left-handed helical structure.

Preferred but not limiting aspects of the method of producing the liquid crystal material of the invention are as follows:

the mixture presents a polymorphism comprising at least a cholesteric phase and/or a smectic C chiral phase;

the first liquid crystal (A) comprises first chiral molecules of liquid crystal (A1);

the first liquid crystal (A) further comprises second molecules of liquid crystal (A2) such that the cholesteric phase and/or the smectic C chiral phase of the mixture has inversion of the pitch of the helix to either side of a critical temperature ($T_C$);

the first liquid crystal (A) may have a positive dielectric anisotropy, or change the sign of dielectric anisotropy depending on the frequency, in which case the first liquid crystal (A) further comprises third molecules of liquid crystal (A3);

the second liquid crystal (B) is in a concentration of less than or equal to 5% of the mixture;

the second liquid crystal (B) is adapted for being activated by UV irradiation;

the mixture further comprises a photoinitiator agent (C) to enhance the formation of the polymer network under UV irradiation;

the mixture further comprises a dispersal agent (D) to enhance the dispersion of the components of the mixture and modify a dynamic of the liquid crystal material during electrical addressing;

the mixture further comprises a thermal polymerisation inhibitor (E);

the mixture further comprises an absorbing agent (F) adapted for absorbing UV radiation so that the liquid crystal material acquires a structure and/or function gradient;

the second treatment is UV irradiation adapted for polymerising the mixture, performed preferably with UV radiation having a wavelength of 365 nm and a power of 0.1 mW/cm$^2$, for an exposure time comprised between 30 and 60 minutes; this enables the mixture to cross-link or gelate;

the second treatment may be a quenching adapted for vitrifying the mixture;

the first treatment may be thermal treatment, and may be either continuous and consist in applying a temperature ramp to the mixture, or discontinuous and consist in bringing the mixture to a treatment temperature different to the critical temperature (TC), the treatment temperature being greater than the critical temperature (TC) when an operating temperature of the liquid crystal material is less than the critical temperature ($T_C$), and inversely, or consist in bringing the mixture to a large number of temperatures on either side of the critical temperature ($T_C$);

the first treatment may be UV irradiation, in which case the first liquid crystal (A) further comprises fourth molecules of liquid crystal (A4) enabling inversion of the pitch of the helix of the cholesteric phase and/or the smectic C chiral phase depending on the UV irradiation; the UV irradiation may be conducted with UV radiation having a wavelength of between 285 and 410 nm and a power of 0.1 mW/cm², during an exposure time of between 1 and 3600 seconds (preferably between 60 and 600 seconds);

the first treatment may consist in applying an electric field or a magnetic field;

the production method further comprises a step consisting in applying to the mixture a third treatment modifying a pitch of the helix of the mixture, this second treatment adapted for being conducted during all or part of the third treatment;

the third treatment may consist in applying to the mixture an electric field having, for example, a frequency of 1 kHz and varying from 0.5 to 20 V/µm;

the third treatment may consist in applying to the mixture a magnetic field varying, for example, from 2 to 15 kG;

the third treatment may consist in applying mechanical pressure to the mixture;

the third treatment may be an electromagnetic irradiation, in which case the first liquid crystal further comprises third liquid crystal molecules (A5) in order for the third treatment to modify the molecular conformation of the mixture;

this electromagnetic irradiation may be performed by UV radiation having a wavelength comprised between 250 and 365 nm, an energy comprised between 1 and 100 mJ/cm², and for an exposure time comprised between 1 and 3600 seconds, preferably between 60 and 600 seconds;

this electromagnetic irradiation may be performed by visible radiation having a wavelength of over 435 nm, an energy comprised between 1 and 100 mJ/cm², and for an exposure time comprised between 1 and 3600 seconds, preferably between 60 and 600 seconds;

before applying any one of the treatments, the mixture is introduced into a capacitive cell comprising two substrates covered with a conducting film.

A liquid crystal device is further proposed according to the invention comprising a substrate on which is placed a liquid crystal material constituted by at least a liquid crystal having a helical structure, characterised in that the entire volume of the material has both a right-handed and left-handed helical structure such that the device has a reflection rate of more than 50%.

According to preferred though non-limiting aspects, the liquid crystal device comprises optical properties adapted for being controlled by application of electric voltage. It may further comprise another substrate covering the liquid crystal material, so as to form a capacitive cell.

DESCRIPTION OF FIGURES

Other characteristics and advantages of the invention will become evident in the following description, which is purely by way of illustration and not limiting and which should be read in the light of the attached drawings, wherein.

DETAILED DESCRIPTION OF THE INVENTION

Figure 1:
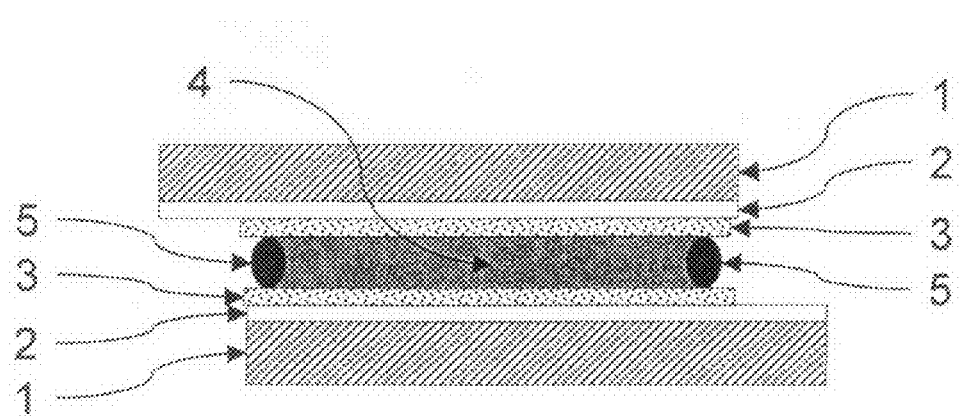
FIG. 1 is a diagrammatic representation of a cell containing the liquid crystal material according to the invention.

Since a cholesteric liquid crystal is a chiral nematic type liquid crystal, its component liquid crystal molecules form a helical structure h with a pitch p. As explained above, this helical organisation enables a cholesteric liquid crystal to reflect light selectively (Bragg reflections) with an associated wavelength $\lambda_R$ that depends on the pitch p of the helical structure and on the mean refractive index n.

Apart from the reflection limit due to the wavelength selectivity, the reflection rate on a cholesteric liquid crystal material, for non-polarised incident light, will always be limited to 50% maximum.

In fact, a wave polarised linearly can decompose as the sum of a left circular polarised wave and a right circular polarised wave. Yet the handedness of the helix, which may be either right or left, implies that only one of the two components, circular right or circular left, of wave polarised linearly may be reflected by cholesteric liquid crystal. This selectivity polarisation rule thus constitutes an additional limit, this time concerning the quantity of light reflected by cholesteric liquid crystal.

The liquid crystal material according to the invention is made such that the reflection rate of a wave reflecting on said liquid crystal material exceeds this limit by 50%.

The starting medium for producing this liquid crystal material is a mixture that has a helical structure because of its composition.

In fact this mixture comprises a first non-photoreactive liquid crystal (A) and a second photoreactive liquid crystal (B). In general, a first chiral liquid crystal (A) will be taken. However, in the case in which the first liquid crystal (A) is not chiral, a second chiral liquid crystal (B) will be chosen, in order for the mixture of the first and second liquid crystals (A and B) to confer a helical structure to the mixture.

The first non-photoreactive liquid crystal (A), which may have a low molar mass or may be a polymer, may consist of identical molecules or a mixture of several molecules. This first liquid crystal (A) may be selected from the family of cyanobiphenyls or cyanoterphenyls and related esters.

A fraction of the first liquid crystal (A) may contain for example the compounds E7, BL001, E44 or E63 from Merck Ltd. or ROTN-570, TNO623 or TN10427 from Hoffman-La Roche.

Further, the first liquid crystal (A) comprises, entirely or partly, chiral liquid crystal molecules (A1). Due to these chiral molecules, the mixture shows polymorphism which comprises of at least a cholesteric phase (further called chiral nematic) and/or a smectic C chiral phase. These liquid crystal molecules (A1) are generally selected non-photoreactive.

These first molecules (A1) may be selected for example from the family of cyanobiphenyls or cyanoterphenyls and related esters. Notably, it is possible to select a compound from the Licrilite™ (Merck Ltd.) family such as BL094 or BL095 or from the following compounds: C15, CB15, ZLI-4571, ZLI-4572 (Merck Ltd.)

The first liquid crystal further comprises second liquid crystal molecules (A2) which enable the cholesteric phase (or smectic C chiral phase) of the mixture to present inversion of the handedness of the helix h on either side of a critical temperature ($T_C$).

The second molecules of liquid crystal (A2) could for example be selected from the following compounds:

- diesters of (S)-1,2-propanediol, diesters of (R,R)-2,3-butanediol (Heppke et al., Z. Naturforsch. 42a, 279-283, 1987);
- (S,S)-EPHDBPE, that is: 4-[(S,S)-2,3-epoxyhexyloxy]-phenyl-4-(decyloxy)-benzoate (Sigma-Aldrich);
- (S, RSrac)-M96 (Dierking et al., Z. Naturforsch. 49a, 1081-1086, 1994; Dierking et al., Liq. Cryst., 18, 443-449, 1995);
- 18,19,21,27-tetranorcholesteryl anisoate (Stegemeyer et al., Z. Naturforsch., A Phys. Sci., 44, 1127, 1989);
- (S)-2-chloropropyl 4'-(4-n-nonyloxyphenylpropiolyloxy) biphenyl-4-carboxylate (Slaney et al., J. Mater. Chem., 2, 805, 1992).

The first liquid crystal (A) has a positive dielectric anisotropy. It may be a liquid crystal known as dual, that is, one that changes the sign of dielectric anisotropy depending on the frequency, if it further comprises particular third liquid crystal molecules (A3).

These third liquid crystal molecules (A3) may be selected, for example, from the following compounds:

- 2F-3333 (Rolic Research Ltd.);
- 4-pentylphenyl 2-chloro-4-(4-pentyl-benzoyloxy) benzoate or 4-octylphenyl 2-chloro-4-(4-heptylbenzoyloxy) benzoate (Acros Organics N. V.)

The mixture further comprises a second photoreactive liquid crystal (B), so as to make the mixture photosensitive. In fact, the second liquid crystal (B) may be activated by UV radiation. Preferably, this second liquid crystal (B) contains more than one functional group, typically acrylate or methacrylate.

The concentration of the second liquid crystal (B) in the mixture may vary from 3 to 100%.

When the concentration of the second liquid crystal (B) is low, typically below 5%, the liquid crystal material will, after treatment, be adapted for being addressed by an electric field, that is to say that it is possible to vary the optical properties depending on the electric field applied.

When the concentration of the second liquid crystal (B) is high, that is over 50%, but typically between 80 and 100%, the final liquid crystal material will be a cross-linked polymer. In this case, the liquid crystal material may form a film that is semi-free (remaining on a rigid or flexible substrate) or free (without substrate).

The second liquid crystal (B) is selected for example from the following compounds:

- RM257, RM82 (Merck Ltd.);
- BAB, BAB-6, BABB-6, BMBB-6 (L.-C. Chien, Recent Advances in Liquid Crystal Polymers, American Chemical Society Book Series, 1995);
- photo-cross-linkable polyorganosiloxane oligomers such as CLM012CN, CC4039, CC390, CC670, CC680, CC1500 (Wacker Chemie Ltd.; EP0711780B1; US005, 641,850A).

Preferably, the mixture further comprises a photoinitiator (C) directed to activating the transformation of the second liquid crystal (B) after UV irradiation for example. The concentration of the photoinitiator (C) may vary between 0.5 and 5.0% of the component (B).

This component (C) may be selected from the following compounds:

- Irgacure 907, Irgacure 651, Darocur 1173 (Ciba-Geigy);
- 2,6-di-terbutyl-4-methylphenol (Sigma-Aldrich).

The mixture may further comprise a dispersal agent (D). This dispersal agent (D), present at between 1 and 30% of the mixture, is directed to enhancing the dispersion of the species in the mixture. When the liquid crystal material may be addressed by an electric field, it also makes it possible to influence the dynamic during molecular reorientation.

The dispersal agent (D) may be selected for example from the following compounds:

- Disperbyk-160 series (BYK Chemie Ltd.);
- Disperon #703 (Kusumoto Kasei Ltd.);
- #24000 (ICI Ltd.).

The mixture may further comprise a thermal polymerisation inhibitor (E). This thermal polymerisation inhibitor (E) is directed to preventing thermal polymerisation of the second liquid crystal (B) particularly. This compound is added in proportions comprised between 0.001 and 5% of compound (B); preferably its concentration is comprised between 0.001 and 1% of compound (B).

This thermal polymerisation inhibitor (E) is selected for example from the following compounds: hydroquinone, 2-hydroxybenzophenone or 4-methoxy-2-hydroxybenzophenone (Sigma-Aldrich).

Finally, the mixture may further comprise an absorbing agent (F) directed to absorbing the UV radiation in order to create materials with a structure and/or function gradient. This absorbing agent (F) typically forms between 0.5 and 2% of the mixture.

The absorbing agent (F) is selected for example in the series of Tinuvin (Ciba-Geigy) such as Tinuvin 1130.

These different components are mixed homogeneously by temperature mixing. In a preferred embodiment, a mixing temperature is selected that is higher than the clarification temperature of each of the compounds.

Another way of producing the mixture consists in placing the different compounds in a capped glass tube and subjecting this glass tube to ultrasounds, with or without heating.

The mixture may be introduced by capillarity into a capacitive cell produced according to the diagram in FIG. 1.

Such a capacitive cell comprises two glass or plastic substrates 1, each of these substrates 1 being covered by a conducting film 2, made of ITO (Indium Tin Oxide) for example, and by a polyimide or polyvinyl alcohol (PVA) surfactant film 3.

The two sets formed in this way are kept apart at a distance of between 1 and 500 µm, preferably between 10 and 20 µm, by the presence of two spacers 5. The spacer 5 may be for example beads, or polymer fibres, or a plastic film with a calibrated thickness.

The liquid crystal mixture 4 described above is then introduced into the space thus formed.

The steps of preparing the photosensitive mixture and introducing it into the capacitive cell are preferably carried out in the dark.

As explained above, when the concentration of the second liquid crystal (B) is over 50%, the liquid crystal material may form a film that is semi-free (remaining on a rigid or flexible substrate) or free (without substrate).

Once the mixture has been made (and either placed on a substrate or in a capacitive cell, or not), it must be treated so that the resulting liquid crystal material has greater, unusual, optical performance and properties. The resulting liquid crystal material will be especially capable of reflecting more than 50% of non-polarised incident light.

Such a transformation of the optical properties of the mixture is carried out by applying two treatments, totally or partly simultaneously.

The first treatment is directed to modify the handedness of the helix characteristic of the mixture with a helical structure.

Since the mixture has, in its cholesteric phase and/or its smectic C chiral phase, a helicity inversion phenomenon at critical temperature $T_C$ (due to the presence of liquid crystal molecules (A2)), the first treatment could consist in bringing the mixture to a given temperature, for example, greater than the critical temperature $T_C$.

The aim of the second treatment is to give the liquid crystal material a memory of the modifications to the helix caused by the first treatment.

The second treatment may be for example UV irradiation performed during the first treatment. The UV irradiation used consists in UV radiation with a wavelength typically of the order of 365 nm, and a power of 0.1 mW/cm$^2$, with a typical exposure time comprised between 30 and 60 minutes.

In the case where the first treatment consists in bringing the mixture to a single temperature, the reaction resulting from the second treatment takes place while the helix of the mixture has a handedness different to that of the helix at the temperature at which measuring the intensity of the light reflected by the liquid crystal material is carried out (typically at ambient temperature). The two temperatures, specifically the reaction temperature and the reflected intensity measuring temperature or the operating temperature of the liquid crystal material, corresponds to helical structures of the mixture which prior to reaction have an identical pitch but opposite directions.

Because of this embodiment, and particularly the second treatment, a polymer network forms in the entire volume of the liquid crystal. The orientational properties of the liquid crystal are strongly influenced by the nature of the polymer network: distribution, homogeneity, symmetry, etc.

As a result of this embodiment, and particularly because the first and second treatments are carried out at least partly simultaneously, the polymer network formed gives the liquid crystal material a memory of the modifications to the helix that occur during the first treatment. As the handedness of the helix defining the structure determines the quantity of light reflected circularly (50% maximum), the material reflects in this case more than 50% of the non-polarised incident light. In fact, the liquid crystal material thus produced has both a right-handed and left-handed helical structure, at least according to a direction parallel to the direction of propagation of the light. From there comes the new property of non-polarisation selectivity, while usual liquid crystal materials have the property of polarisation selectivity. In terms of light and energy yields, there is interest in the two polarisation directions being present in the reflected and/or transmitted wave and this within one and the same wave. Since the entire volume of the material has both a right-handed and left-handed helical structure, i.e. at least in the direction of propagation of the light (in general the direction perpendicular to the plane of the film of material), one and the same incident wave interacts with the helices of two directions. The result is that the reflected wave carries two components polarised circularly from inverse directions, the characteristic of which comes from exceeding the usual reflection limit by 50%.

Figure 2:
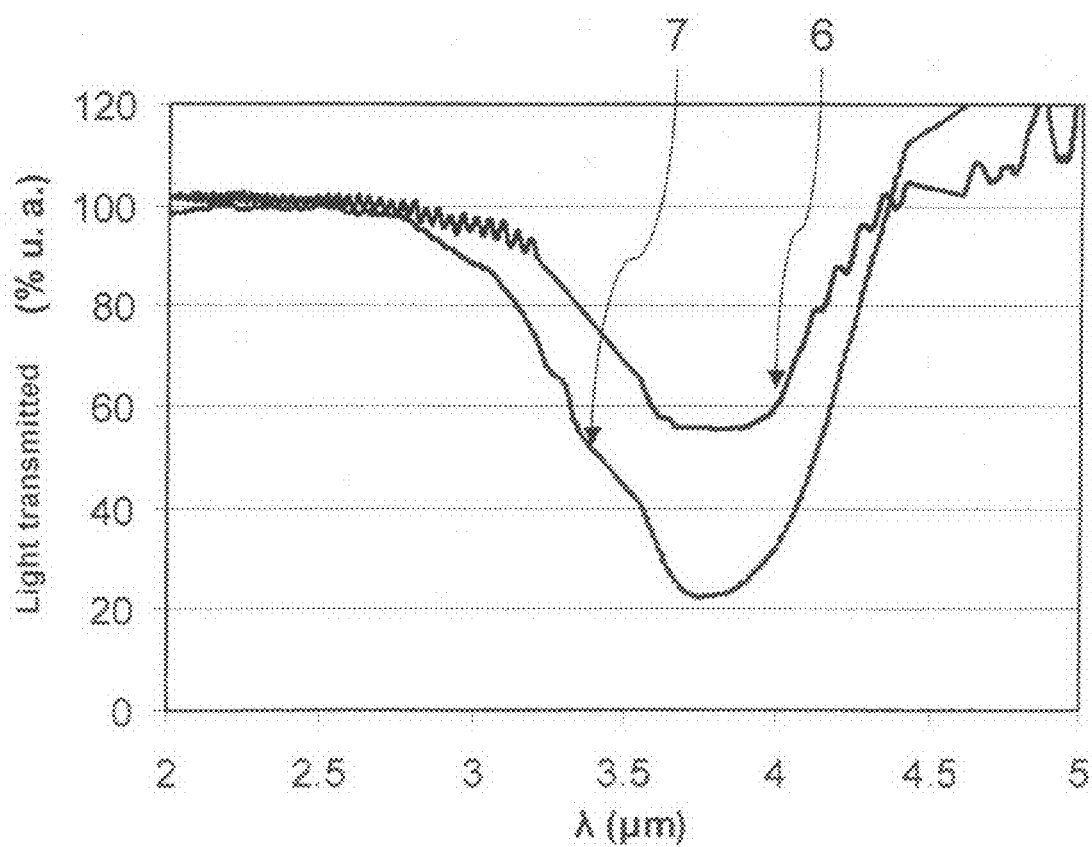
FIG. 2 is a graph showing the modification in the light spectrum transmitted by a liquid crystal material produced according to the invention.

FIG. 2, which shows the percentage of light transmitted depending on the wavelength of the light, enables a comparison for a particular example of the wavelength reflection bandwidth of a liquid crystal material that has not been subjected to either of the two treatments (line 6) and a liquid crystal material having been produced according to the embodiment of the invention (line 7). It is apparent on line 6 that, in the absence of treatment, the liquid crystal material reflects classically around 40% of a non-polarised light beam having a wavelength of 3.8 µm, whereas after treatment, the reflection approaches a rate of around 80% at the same wavelength (line 7).

The first treatment consisting in varying the handedness of the helix of the mixture may be conducted by other thermal processes.

In fact, instead of bringing the mixture to a single temperature, the mixture could for example be brought to a plurality of temperatures, while applying the second treatment consisting for example of UV irradiation of the mixture. Reaction thus takes place for a plurality of temperatures $T_1, T_2, \ldots T_n$ corresponding to pitches $p_1, p_2, \ldots p_n$. Its homologue corresponds to each pitch $p_i$ having a reverse helix, i.e. a helix having the same absolute value in pitch but in the reverse direction. This particular process will be especially preferred in the event where the mixture comprises a very strong concentration of second liquid crystal (B), of the order of 80 to 100% typically. In fact, in this case, the final liquid crystal material will be solid and it is therefore thermal treatment at a plurality of temperatures which enables the structure finale to have helices in both directions.

The first treatment for changing the handedness of the helix consisting in discontinuous thermal treatment may further be replaced by continuous thermal treatment such as application of a thermal ramp. In this case, formation of a polymer network takes place while the helical structure of the mixture changes progressively in direction. The resulting liquid crystal material comprises a memory of these progressive modifications to the handedness of the helix.

Another variant of this embodiment consists in changing the handedness of the helix by UV irradiation rather than by thermal treatment.

In this case, the first liquid crystal (A) of the starting mixture comprises fourth molecules of liquid crystal (A4) such that the handedness of the helix changes according to UV radiation.

The fourth molecules of liquid crystal (A4) could be taken from the following list of compounds:

- series of 3-(R)-methyl-6-arylidenecyclohexanone, (+)-isomenthone derivatives (Krivoshey et al., Proc. SPIE, 5257, 13, 2003; Krivoshey et al., Funct. Mat., 11, 1, 76-81, 2004)
- azobenzene family including (R)-3-1-(1-methylhexyloxy)-3'-octyloxy-2,2'-dimethylazobenzene (Ruslim et al., J. Mater. Chem., 12, 3377-3379, 2002)
- 3,3'-disubstituted azobenzenes (Ruslim et al., J. Mater. Chem., 9, 673-681, 1999).

The corresponding UV irradiation takes place at a wavelength of between 285 and 410 nm, with an exposure time varying between a few seconds and a few tens of minutes (between 1 second and 3600 seconds); this exposure time will preferably be between 6° and 600 seconds.

According to yet another variant of the invention, the first treatment consisting in changing the handedness of the helix of the structure of the mixture is the application of an electric field or a magnetic field.

In another particular embodiment of the invention, the initial mixture is treated such that the helix defining the structure of the mixture changes not only in handedness but also in pitch p. In fact, as restated earlier, a liquid crystal having a helical structure selectively reflects light with a wavelength depending especially on the pitch p of the helix.

Since the treatment for modifying the pitch p of the helix is conducted in all or part simultaneously to the second treatment aimed at forming a polymer network, the resulting liquid crystal material has a memory of the change in pitch of the helix.

Because of this, the resulting liquid crystal material has a widened reflection wavelength band. Enlarging the reflection band obtained depends on the amplitude of the variation in pitch depending on the control parameter of the reaction; the bigger this amplitude the wider the reflection band.

According to a first variant, the pitch of the helix of the mixture changes as a consequence of the thermal treatment applied to the mixture as first treatment to modify the handedness of the helix.

Thus, in the case of discontinuous thermal treatment according to a plurality of temperatures, or in the case of continuous thermal treatment according to a temperature ramp, the helix defining the structure of the mixture changes not only in handedness but also changes in pitch during thermal treatment. Thus, the liquid crystal material created comprises a memory of the progressive modifications to the helix, both at the level of its handedness and its pitch, as an indirect consequence.

Another way to modify the pitch of the helix of the mixture while modifying its handedness consists in applying a third treatment at least in part simultaneously with the first, and the second treatment consisting respectively of modifying the handedness of the helix and forming a polymer network.

In this case, the pitch of the helix may be changed by applying an electric field. For example, an electric field with a frequency of 1 kHz, and varying from 0.5 to 20 V/µm may be applied.

It is further possible to vary the pitch of the helix by applying a magnetic field varying for example from 2 to 15 kG (from 0.2 to 1.5 T).

Another solution for changing the pitch of the helix consists in applying mechanical pressure on the capacitive cell.

Finally, changing the pitch of the helix defining the structure of the mixture may be performed by modifying the molecular conformation of the structure induced by electromagnetic radiation, where this electromagnetic radiation may be visible or UV radiation. To this end, the first liquid crystal (A) of the mixture comprises fifth liquid crystal molecules (A5) that make up between 0.1 and 10% of the mixture, these fifth molecules being chosen from the following compounds:

- family of azobenzenes or azoxybenzenes (Kurihara et al., Chem. Mater., 13, 1992, 2001; Kusumoto et al., Mol. Cryst. Liq. Cryst., 14, 727, 1993; Negishi et al., Chem. Lett., 319, 1996 and 583, 1996; Bobrovsky et al., Adv. Mater., 12, 1180-3, 2000; Kitaeva et al., Mol. Cryst. Liq. Cryst., 2, 261-279, 1992) including 4,4'-dialkylazobenzenes (Moriyama et al., J. Mater. Chem., 11, 1003-1010, 2001);
- fulgide family (Yokoyama et al., Chem. Lett., 687, 1997) including indole fulgide (Janicki et al., J. Am. Chem. Soc., 117, 8524, 1995), bisnaphthol-based chiral fulgide derivatives (Yokoyama et al., Chem. Lett., 687, 1997);
- diarylethene family (Uchida et al., Chem. Lett., 654, 2000; Yamaguchi et al., Chem. Mater., 12, 869, 2000) including diarylethylene-bis imine (Denekamp et al., Adv. Mater., 10, 1081, 1998);
- family of overcrowded alkenes (Fering a et al., J. Am. Chem. Soc., 117, 9929, 1995; Huck et al., Science, 273, 1686, 1996).

In this case, a trans-cis photoisomerisation or a photocyclisation will occur for example, from the effect of UV radiation with a wavelength comprised between 250 and 365 nm.

The reverse change will occur from the action of visible radiation with a wavelength greater than or equal to 435 nm.

Electromagnetic irradiation is applied with radiation having energy typically comprised between 1 and 100 mJ/cm$^2$ and irradiation times that may vary from several seconds to several tens of minutes (between 1 and 3600 seconds), typically of the order of several minutes (i.e. between 60 and 600 seconds).

The liquid crystal material resulting from the formation of a polymer network concurrently with modifications to the handedness and the pitch of the helix defining the structure of the initial mixture makes it possible to not only reflect more than 50% of non-polarised incident light, but also to reflect the light over a broader band of wavelengths, typically of the order of several hundred nanometres (between 100 and 500 nanometres) in the visible spectre.

Finally, when the material comprises less than 5% of polymer network, the light reflection property may be modified by applying an alternative electric field with a typical frequency of the order of 1 kHz. This is the case for example when the photoreactive liquid crystal (B) of the mixture is in a low concentration, typically under 5%.

In this case, the liquid crystal material may be addressed. The optical cell passes gradually from a reflecting state to a diffusing state (typically from 1 V/µm) then becomes transparent (typically from 10 V/µm).

The reader will have understood that many modifications may be applied without materially departing from the new methods and advantaged described here. Therefore, all modifications of this type are directed to being incorporated within the scope of the device for producing a liquid crystal material according to the invention, and the liquid crystal method comprising such a liquid crystal material.

The invention claimed is:

1. A method for producing a liquid crystal material, characterised in that it comprises the following steps consisting in:
   applying a first treatment to the liquid crystal mixture having a helical structure comprising a first non-photoreactive liquid crystal (A) and a second photoreactive second liquid crystal (B), said first treatment modifying a handedness of the helix of the mixture, wherein said first treatment comprises application of a thermal treatment, a UV irradiation, an electric field or a magnetic field;
   applying a second treatment to the mixture such that the second liquid crystal (B) forms a polymer network, the second treatment being performed during all or part of the first treatment such that the liquid crystal material keeps a memory of the modifications to the helix and that the material has its entire volume both a right-handed and left-handed helical structure, wherein said second treatment comprises UV irradiation to polymerise the mixture or a quenching for vitrifying the mixture.

2. The method of claim 1, characterised in that the mixture presents a polymorphism comprising at least a cholesteric phase and/or a smectic C chiral phase.

3. The method of claim 1, characterised in that the first liquid crystal (A) comprises first molecules of chiral liquid crystal (A1).

4. The method of claim 3, characterised in that the first liquid crystal (A) further comprises second molecules of liquid crystal (A2) such that the cholesteric phase and/or the smectic C chiral phase of the mixture has inversion of the handedness of the helix to either side of a critical temperature ($T_c$).

5. The method of claim 2, characterised in that the first liquid crystal (A) has a positive dielectric anisotropy.

6. The method of claim 2, characterised in that the first liquid crystal (A) further comprises third liquid crystal molecules (A3) so that it is adapted for changing the sign of dielectric anisotropy depending on the frequency.

7. The method of claim 1, characterised in that the second liquid crystal (B) is in a concentration of less than or equal to 5% of the mixture.

8. The method of claim 1, characterised in that the second liquid crystal (B) is in a concentration greater than 50% of the mixture.

9. The method of claim 8, characterised in that the second liquid crystal (B) is in a concentration greater than 80% of the mixture.

10. The method of claim 1, characterised in that the second liquid crystal (B) is adapted for being activated by UV irradiation.

11. The method of claim 1, characterised in that the mixture further comprises a photoinitiator agent (C) to enhance the formation of the polymer network in UV irradiation.

12. The method of claim 1, characterised in that the mixture further comprises a dispersal agent (D) to enhance the dispersion of the components of the mixture and modify a dynamic of the liquid crystal material during electrical addressing.

13. The method of claim 1, characterised in that the mixture further comprises a thermal polymerisation inhibitor (E).

14. The method of claim 1, characterised in that the mixture further comprises an absorbing agent (F) adapted for absorbing UV radiation so that the liquid crystal material has a structure and/or function gradient.

15. The method of claim 1, characterised in that the second treatment is UV irradiation, wherein said UV irradiation is performed with UV radiation having a wavelength of the order of 365 nm and a power of 0.1 mW/cm$^2$, for an exposure time comprised between 30 and 60 minutes.

16. The method of claim 1, characterised in that the second treatment is UV irradiation enabling cross-linking of the mixture.

17. The method of claim 1, characterised in that the second treatment is UV irradiation enabling gelation of the mixture.

18. The method of claim 1, characterised in that the first treatment is a thermal treatment, wherein said thermal treatment is continuous and consists in applying a temperature ramp to the mixture.

19. The method of claim 1, characterised in that the first treatment is a thermal treatment, wherein said thermal treatment is discontinuous and consists in bringing the mixture to a treatment temperature different from the critical temperature ($T_c$), the treatment temperature being greater than the critical temperature ($T_c$) when an operating temperature of the liquid crystal material is less than the critical temperature ($T_c$), and inversely.

20. The method of claim 1, characterised in that the first treatment is a thermal treatment, wherein said thermal treatment is discontinuous and consists in bringing the mixture to a plurality of temperatures on either side of the critical temperature ($T_c$).

21. The method of claim 1, characterised in that the first treatment is UV irradiation, wherein the first liquid crystal (A) further comprises fourth molecules of liquid crystal (A4) for enabling inversion of the handedness of the helix of the cholesteric phase and/or the smectic C chiral phase depending on the UV irradiation.

22. The method of claim 1, characterised in that the first treatment is UV irradiation, wherein said UV irradiation is performed with UV radiation having a wavelength comprised between 285 and 410 nm and a power of 0.1 mW/cm$^2$, for an exposure time of between 1 and 3600 seconds.

23. The method of claim 22, characterised in that the UV irradiation is performed for an exposure time of between 60 and 600 seconds.

24. The method of claim 1, characterised in that it further comprises a step consisting in applying to the mixture a third treatment modifying a pitch of the helix of the mixture.

25. The method of claim 24, characterised in that the second treatment is performed during all or part of the third treatment.

26. The method of claim 24, characterised in that the third treatment consists in applying an electric field to the mixture.

27. The method of claim 26, characterised in that the electric field has a frequency of 1 kHz and varies from 0.5 to 20 V/μm.

28. The method of claim 24, characterised in that the third treatment consists in applying a magnetic field to the mixture.

29. The method of claim 28, characterised in that the magnetic field varies from 2 to 15 kG.

30. The method of claim 24, characterised in that the third treatment consists in applying mechanical pressure to the mixture.

31. The method of claim 24, characterised in that the third treatment is an electromagnetic irradiation, and the first liquid crystal further comprises fifth molecules (A5) of liquid crystal so that the third treatment modifies the molecular conformation of the mixture.

32. The method of claim 31, characterised in that the electromagnetic irradiation is performed by UV radiation having a wavelength of between 250 and 365 nm, energy of between 1 and 100 mJ/cm$^2$, and for an exposure time of between 1 and 3600 seconds.

33. The method of claim 32, characterised in that the exposure time is between 60 and 600 seconds.

34. The method of claim 31, characterised in that the electromagnetic irradiation is performed by visible radiation having a wavelength greater than 435 nm, energy of between 1 and 100 mJ/cm$^2$, and for an exposure time of between 1 and 3600 seconds.

35. The method of claim 34, characterised in that the exposure time is between 60 and 600 seconds.

36. The method of claim 1, characterised in that, before applying any one of the treatments, the mixture is introduced into a capacitive cell comprising two substrates covered with a conductive film.

37. A crystal liquid device comprising a substrate on which is placed a liquid crystal material comprising at least a liquid crystal having a helical structure, characterised in that the entire volume of the material has both a right-handed and left-handed helical structure, such that the device has a reflection rate of more than 50%.

38. The crystal liquid device of claim 37, characterised in that the liquid crystal material can be addressed by an electric field.

39. The crystal liquid device claim 37, characterised in that it further comprises another substrate covering the liquid crystal material, so as to form a capacitive cell.

* * * * *